United States Patent
Nagaishi et al.

(10) Patent No.: US 9,766,330 B2
(45) Date of Patent: Sep. 19, 2017

(54) MILLIMETER-WAVE DIELECTRIC LENS ANTENNA AND SPEED SENSOR USING SAME

(71) Applicant: Hitachi Automotive Systems, Ltd., Hitachinaka-shi, Ibaraki (JP)

(72) Inventors: Hideyuki Nagaishi, Tokyo (JP); Takafumi Matsumura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 213 days.

(21) Appl. No.: 14/654,703

(22) PCT Filed: Dec. 13, 2013

(86) PCT No.: PCT/JP2013/083417
§ 371 (c)(1),
(2) Date: Jun. 22, 2015

(87) PCT Pub. No.: WO2014/125716
PCT Pub. Date: Aug. 21, 2014

(65) Prior Publication Data
US 2015/0346334 A1  Dec. 3, 2015

(30) Foreign Application Priority Data
Feb. 13, 2013 (JP) ................ 2013-025107

(51) Int. Cl.
*G01S 13/93* (2006.01)
*G01S 13/60* (2006.01)
(Continued)

(52) U.S. Cl.
CPC .......... *G01S 13/60* (2013.01); *H01Q 1/38* (2013.01); *H01Q 1/42* (2013.01); *H01Q 1/421* (2013.01);
(Continued)

(58) Field of Classification Search
CPC .................. G01S 13/60; H01Q 1/38
(Continued)

(56) References Cited

U.S. PATENT DOCUMENTS 4,517,566 A * 5/1985 Bryant ............... G01S 13/60
342/117
5,905,457 A * 5/1999 Rashid ............... G01S 13/931
342/70
(Continued)

FOREIGN PATENT DOCUMENTS

EP  0 280 379 A2  8/1988
JP  63-224507 A  9/1988
(Continued)

OTHER PUBLICATIONS

International Search Report (PCT/ISA/210) dated Mar. 25, 2014 with English translation (three pages).

*Primary Examiner* — Marcus Windrich
(74) *Attorney, Agent, or Firm* — Crowell & Moring LLP

(57) ABSTRACT

A speed sensor which aligns a normal direction of one patch antenna which is disposed on a mounted board, and an optical axis of a dielectric lens uses a frame for inclining a sensor module, in order to obtain a component cos θ in a traveling direction when the speed sensor is installed on a horizontally vertical surface of an automobile or a railway car. When beams are condensed by using the one patch antenna and the cannonball-shaped dielectric lens, the dielectric lens is inclined and a bottom surface portion of the lens is cut with a plane parallel with a surface of the antenna-mounted board. The one patch antenna is configured by one patch and a GND electrode and the gain center of radiation characteristics is a normal direction of the antenna board. However, the radiation characteristics have a substantially hemisphere surface wave shape.

12 Claims, 17 Drawing Sheets

(51) Int. Cl.
*H01Q 1/38* (2006.01)
*H01Q 1/42* (2006.01)
*H01Q 15/08* (2006.01)
*H01Q 19/09* (2006.01)
*G01S 7/03* (2006.01)
*G01S 7/02* (2006.01)
*G01S 13/87* (2006.01)

(52) U.S. Cl.
CPC ............ *H01Q 15/08* (2013.01); *H01Q 19/09* (2013.01); *G01S 7/025* (2013.01); *G01S 7/03* (2013.01); *G01S 13/87* (2013.01); *G01S 2007/027* (2013.01)

(58) Field of Classification Search
USPC .............................................. 342/70–72, 115
See application file for complete search history.

(56) References Cited

U.S. PATENT DOCUMENTS

| | | | | |
|---|---|---|---|---|
| 6,037,894 | A * | 3/2000 | Pfizenmaier | G01S 7/032 342/128 |
| 6,717,544 | B2 * | 4/2004 | Nagasaku | G01S 7/032 342/175 |
| 7,532,153 | B2 * | 5/2009 | Nagasaku | G01S 7/032 342/104 |
| 8,344,939 | B2 * | 1/2013 | Focke | G01S 13/931 342/153 |
| 2006/0139206 | A1 * | 6/2006 | Nagasaku | G01S 7/032 342/104 |
| 2006/0220952 | A1 * | 10/2006 | Aoki | G01S 13/89 342/175 |
| 2008/0088510 | A1 * | 4/2008 | Murata | H01Q 3/24 343/700 MS |

FOREIGN PATENT DOCUMENTS

| | | |
|---|---|---|
| JP | 10-505429 A | 5/1998 |
| JP | 2000-278030 A | 10/2000 |
| JP | 2006-184144 A | 7/2006 |
| JP | 2007-270459 A | 10/2007 |

* cited by examiner

[Fig. 1]
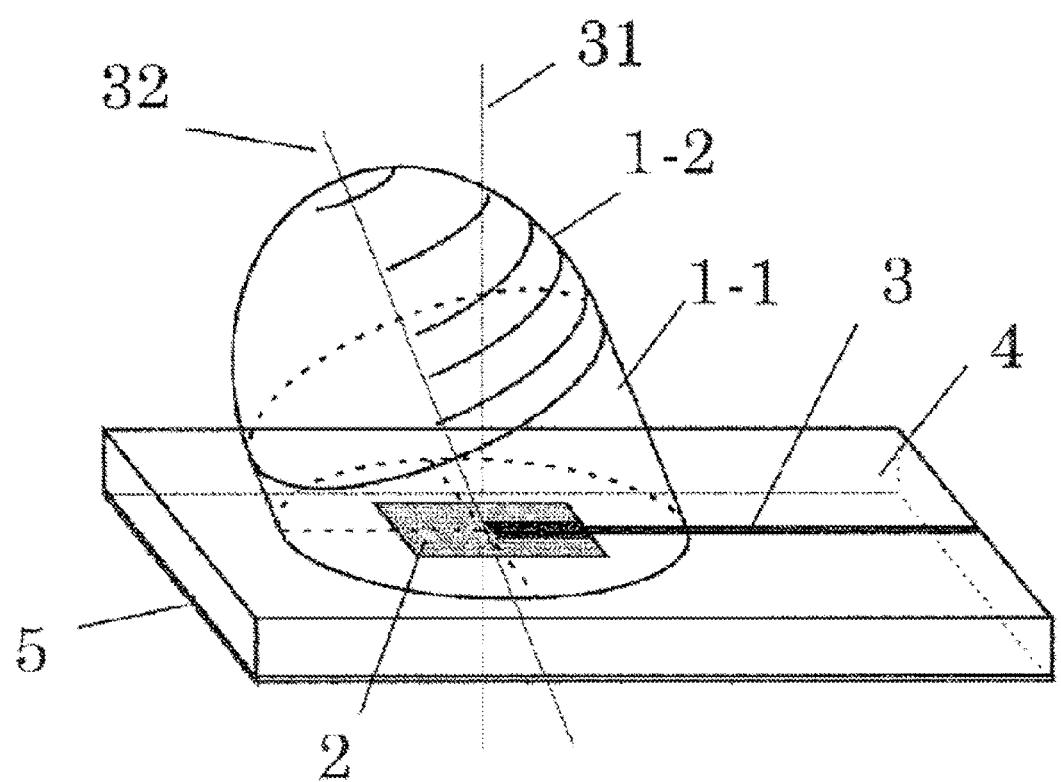

[Fig. 2]
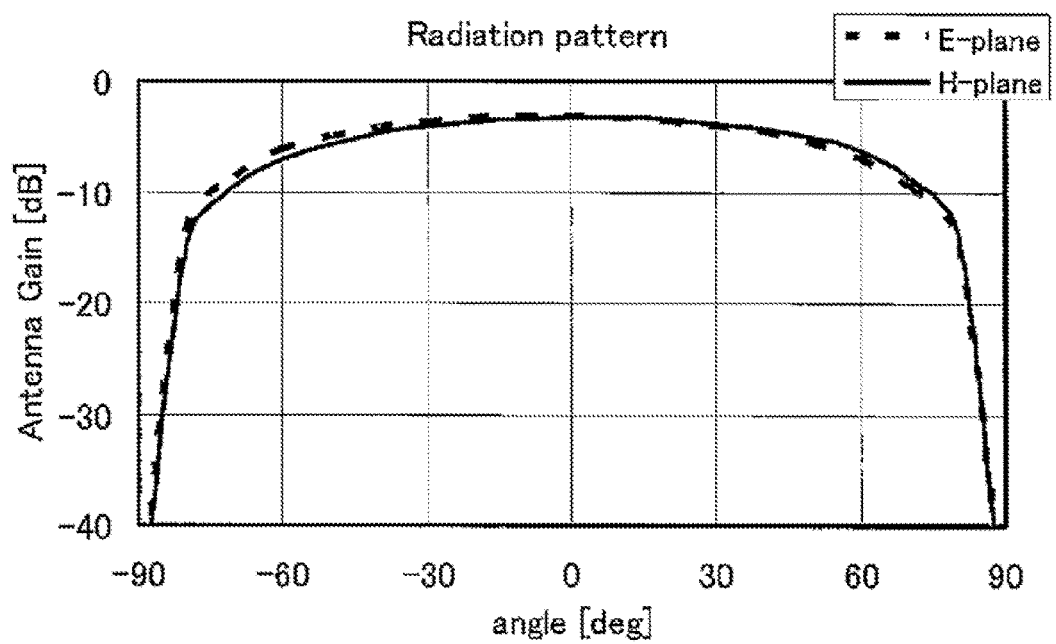

[Fig. 3]
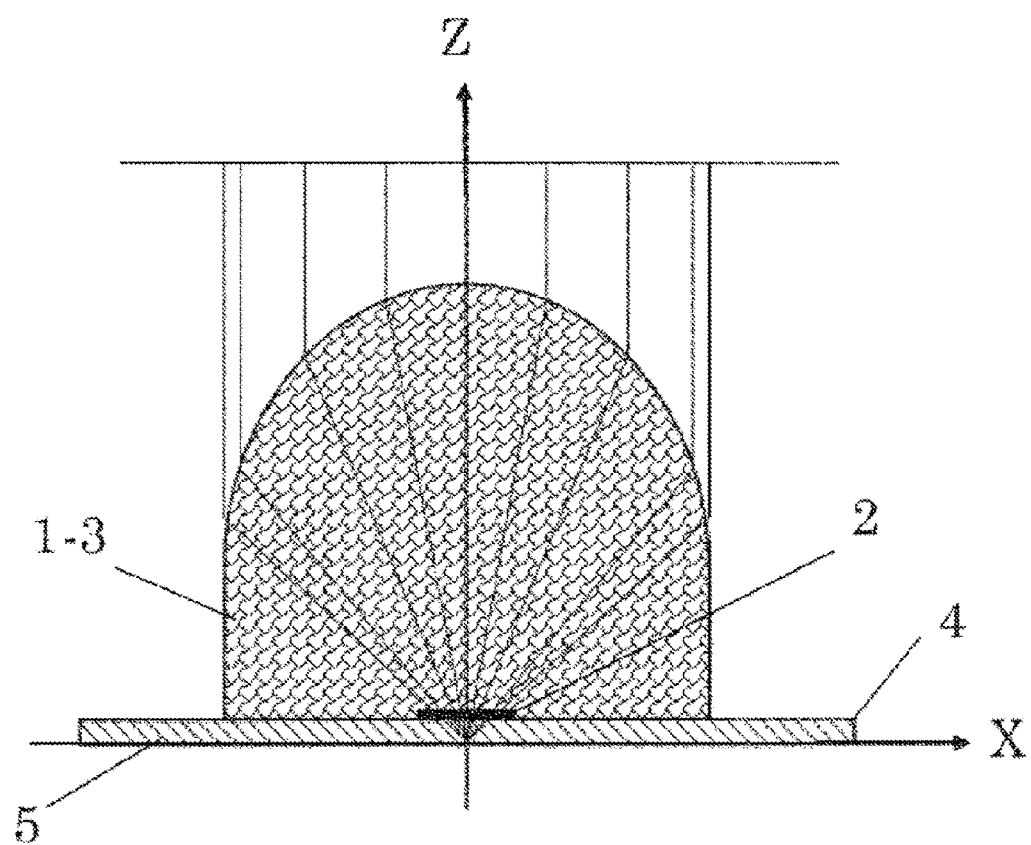

[Fig. 4]
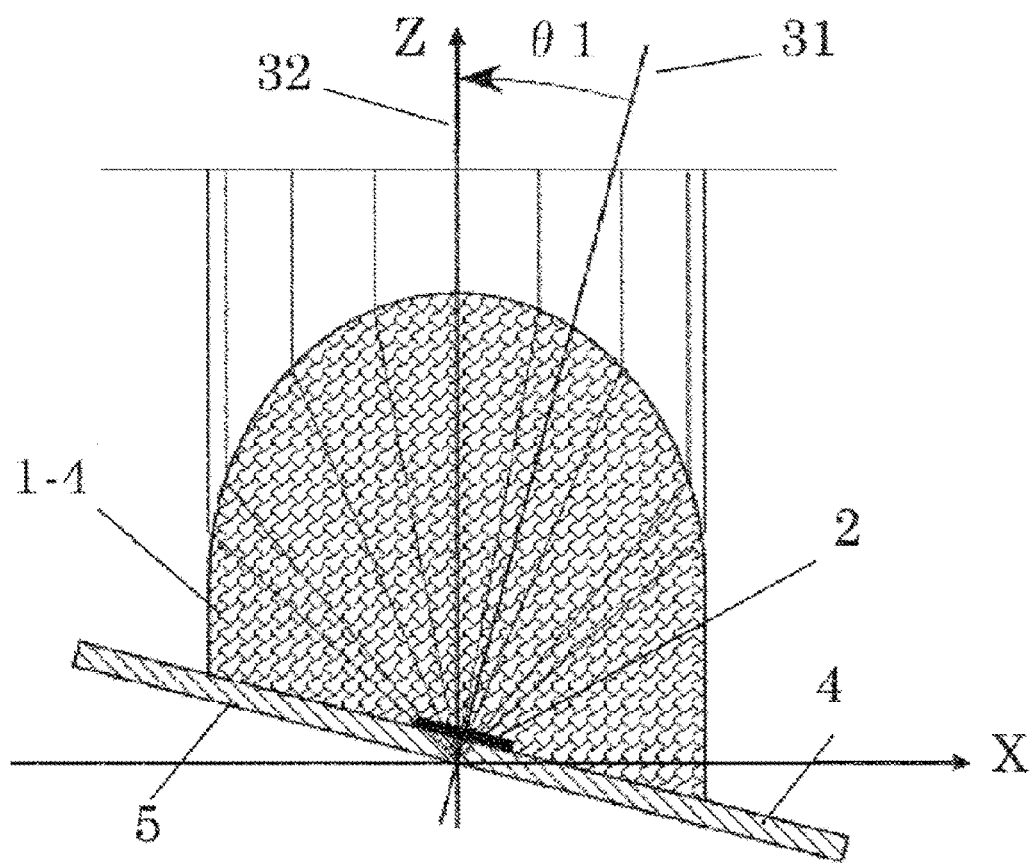

[Fig. 5]
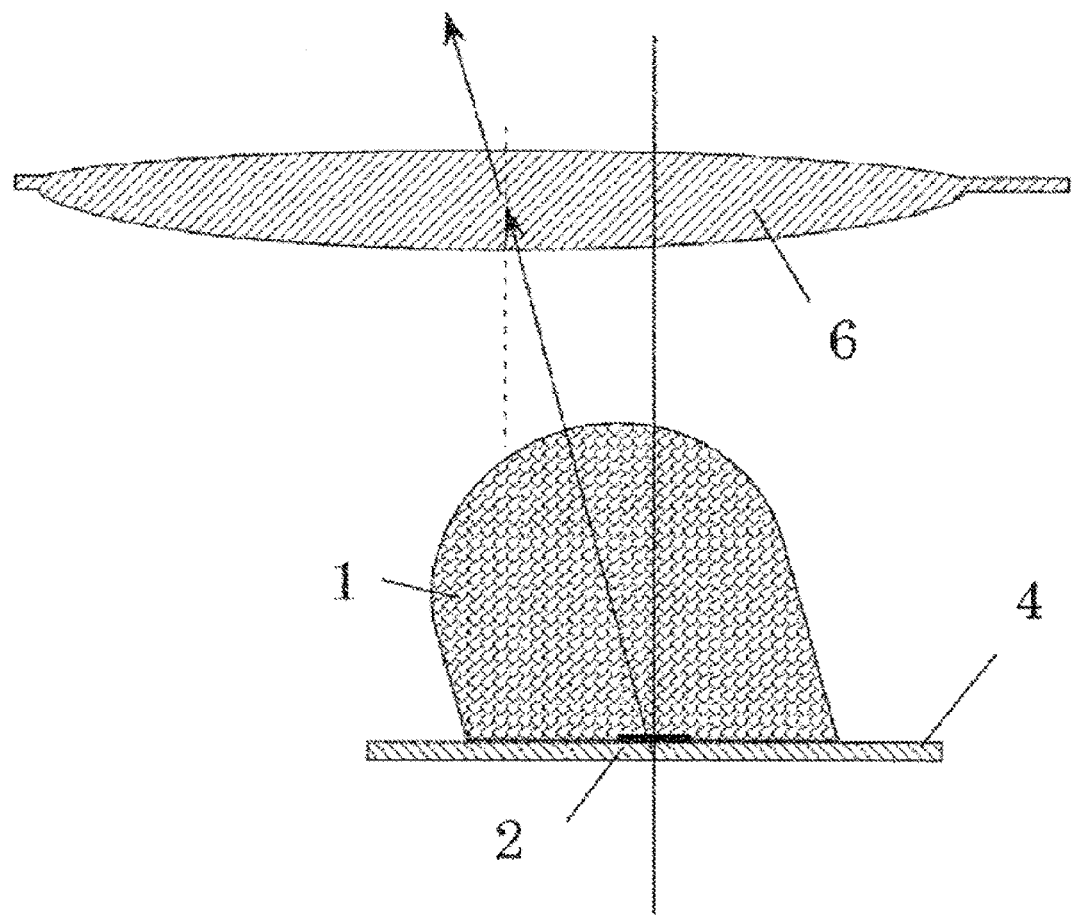

[Fig. 6]
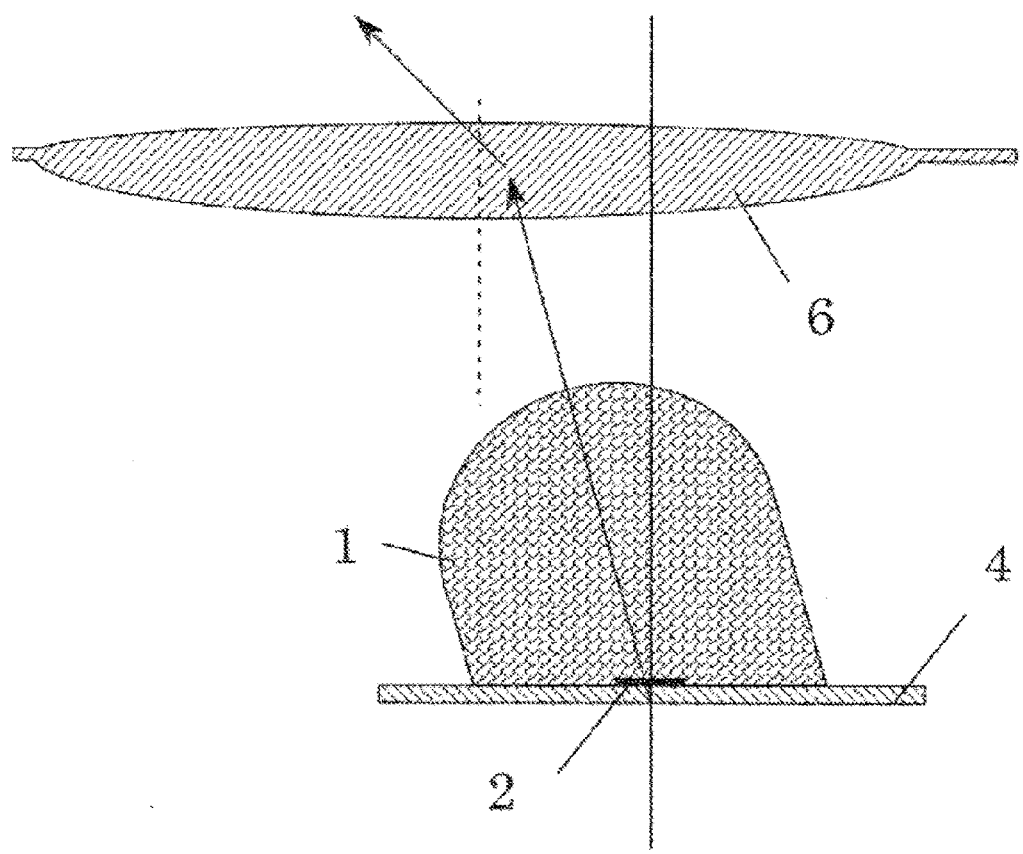

[Fig. 7]
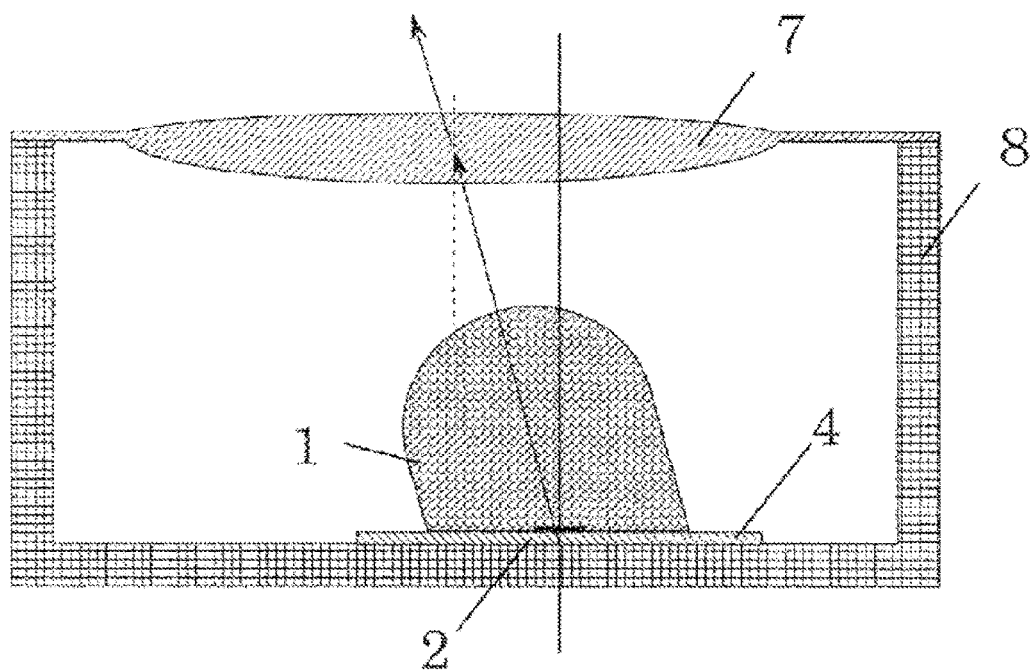

[Fig. 8]
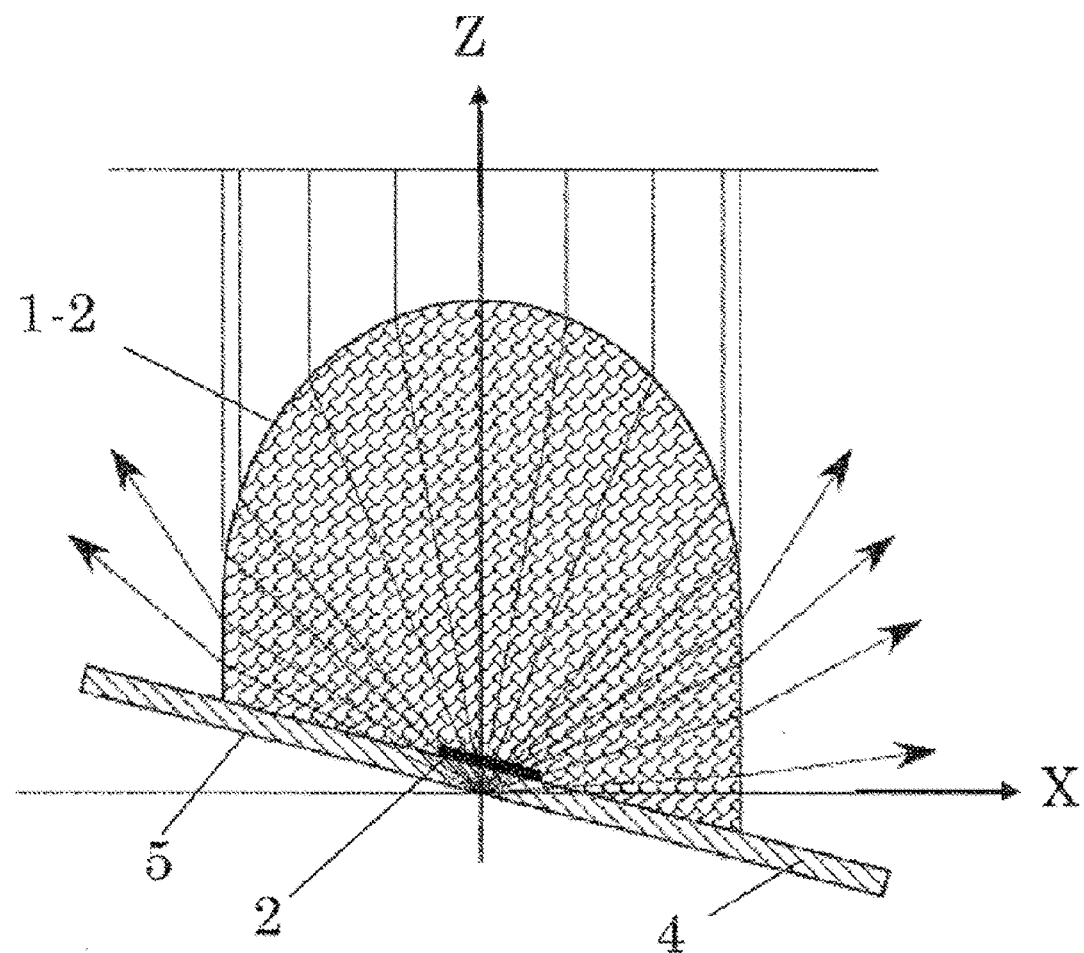

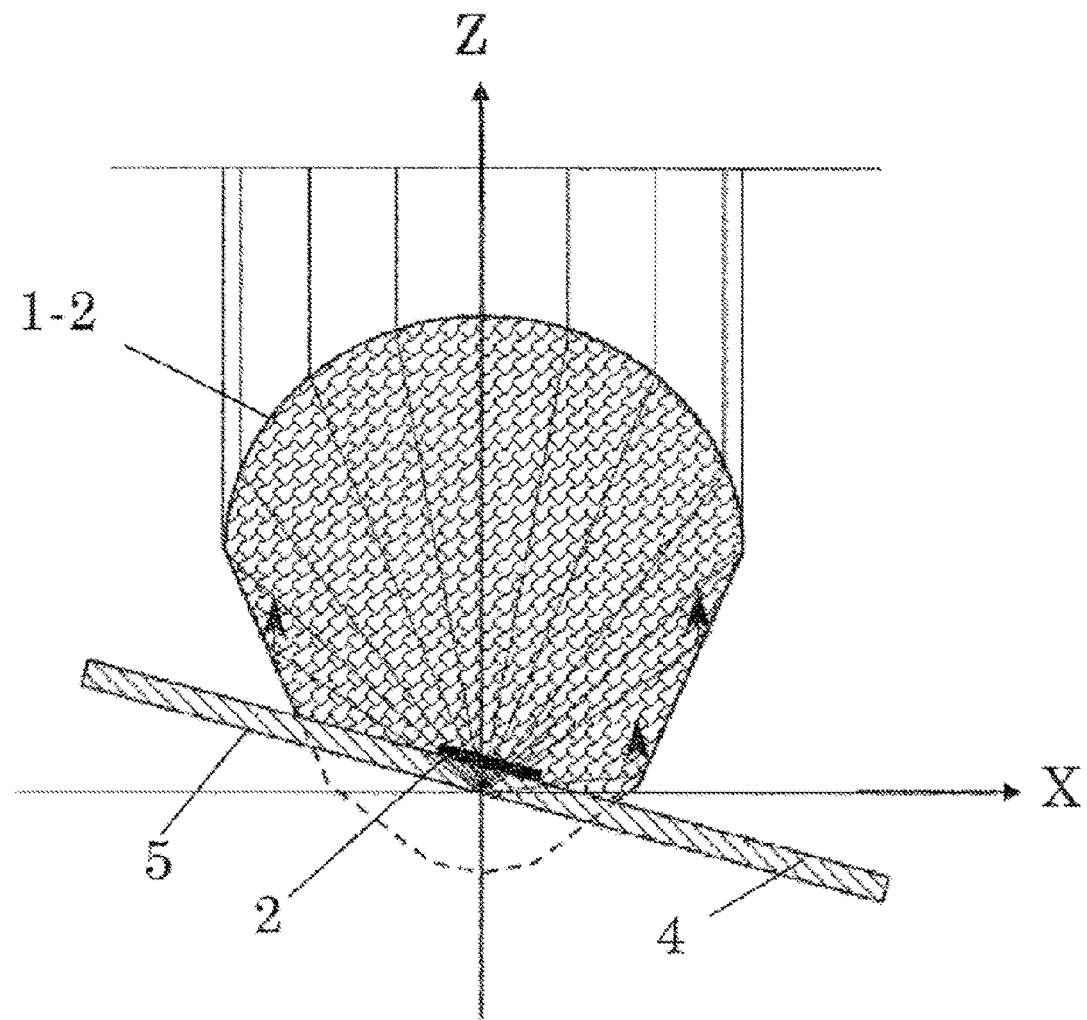
[Fig. 9]

[Fig. 10]
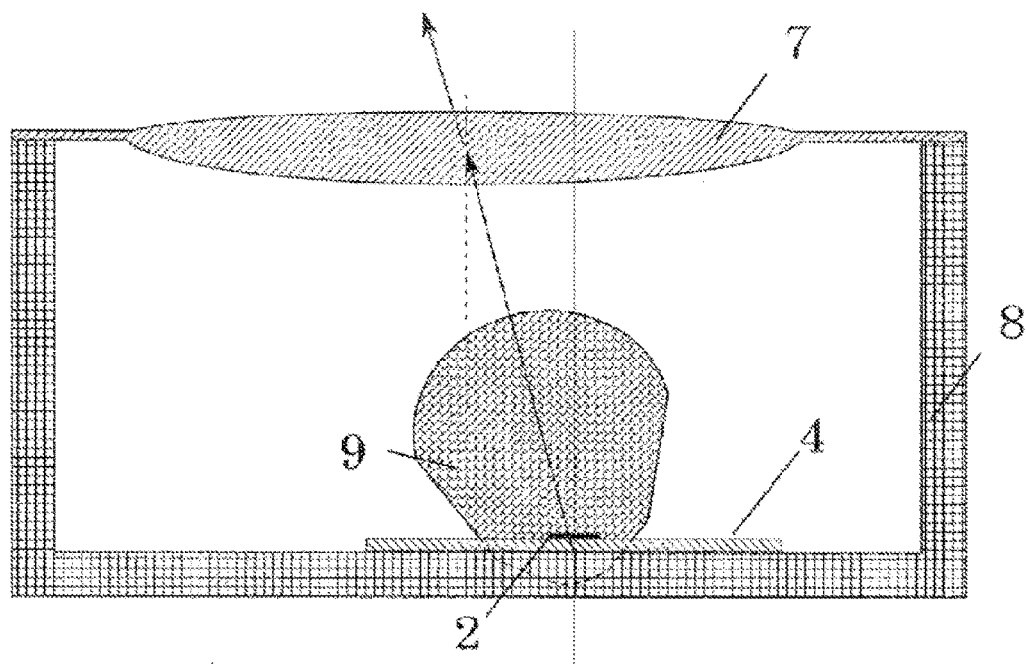

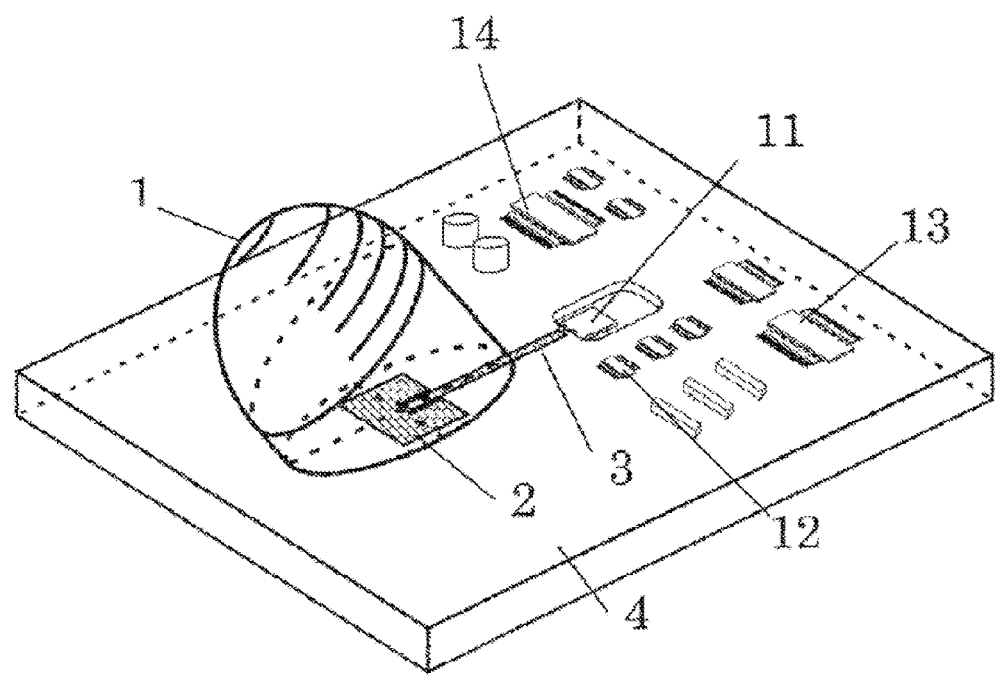
[Fig. 11]

[Fig. 12]
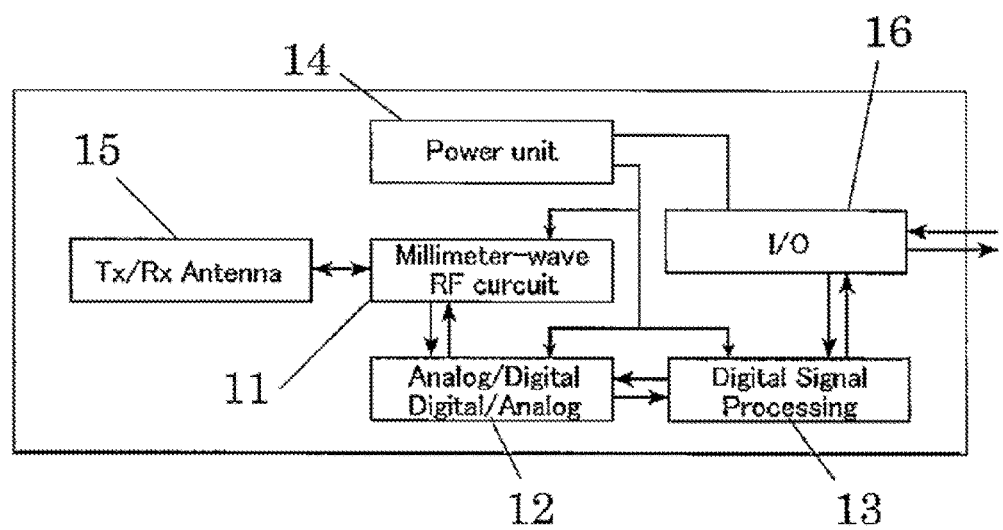

[Fig. 13]
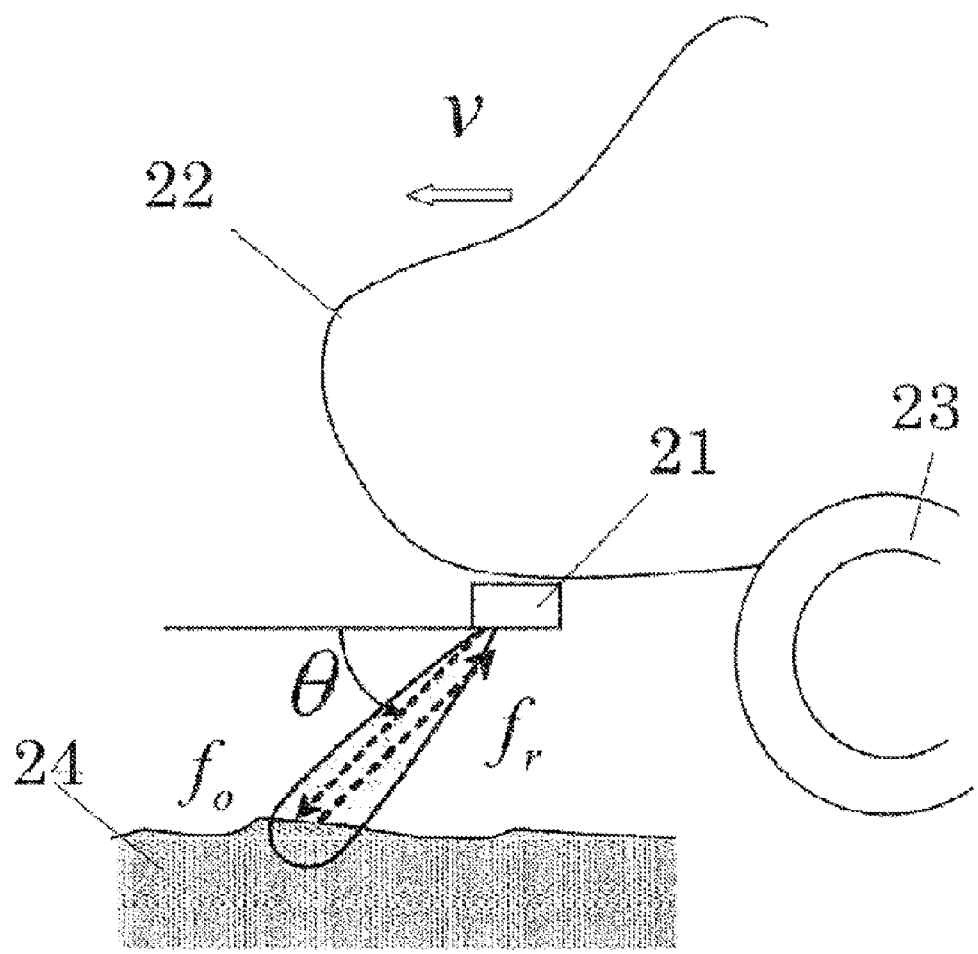

[Fig. 14]
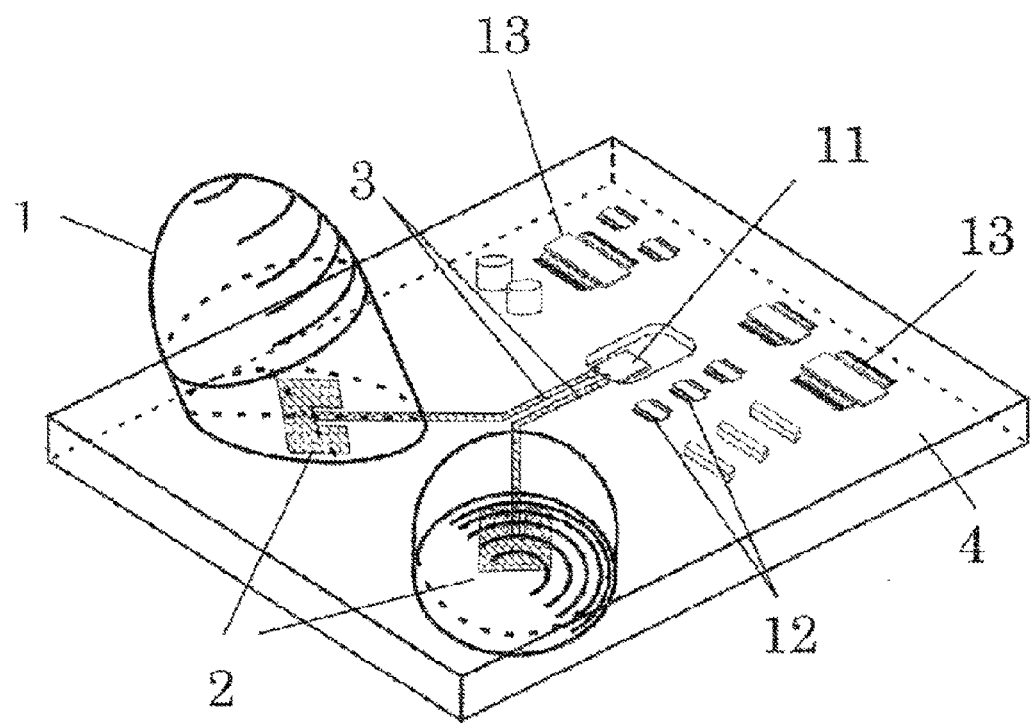

[Fig. 15]
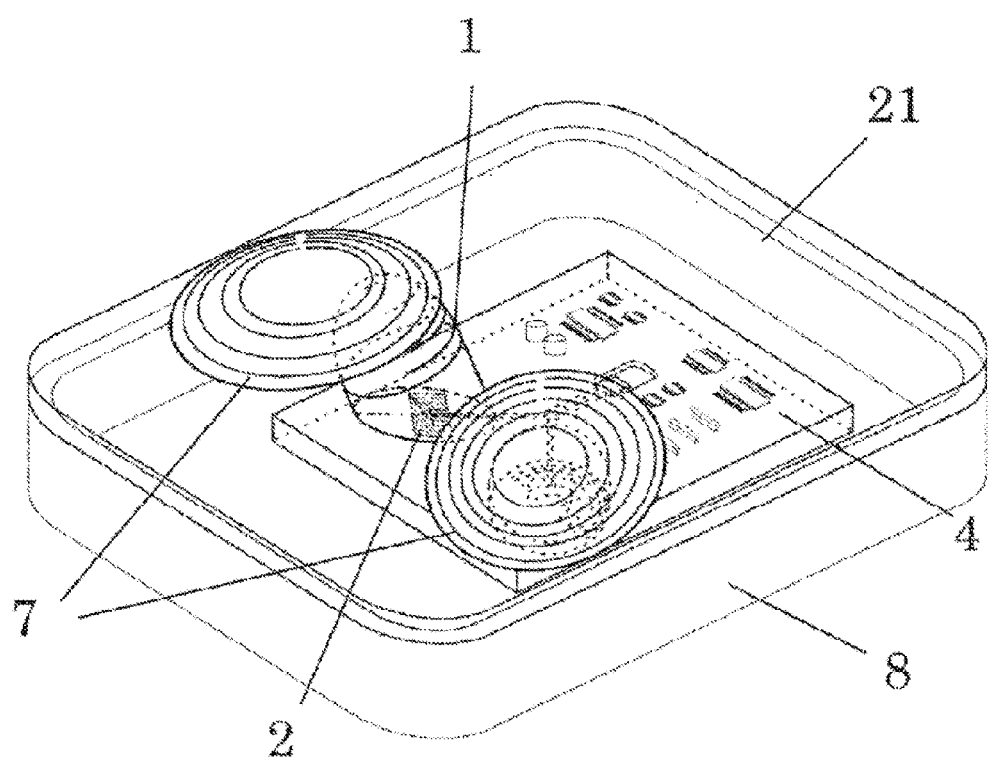

[Fig. 16]
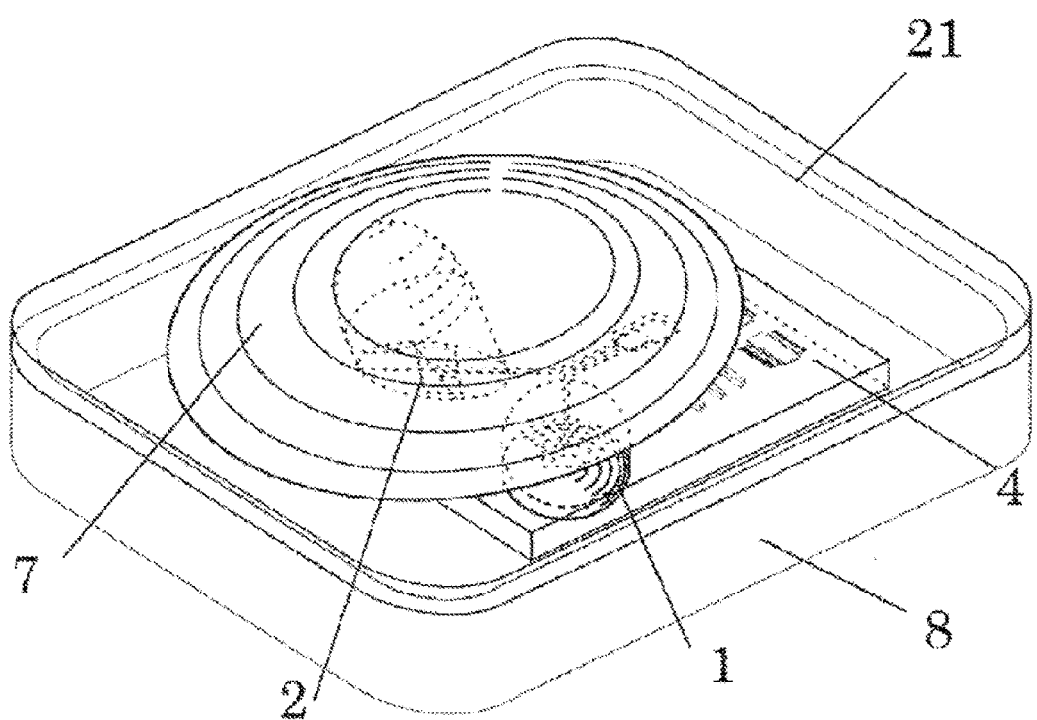

[Fig. 17]
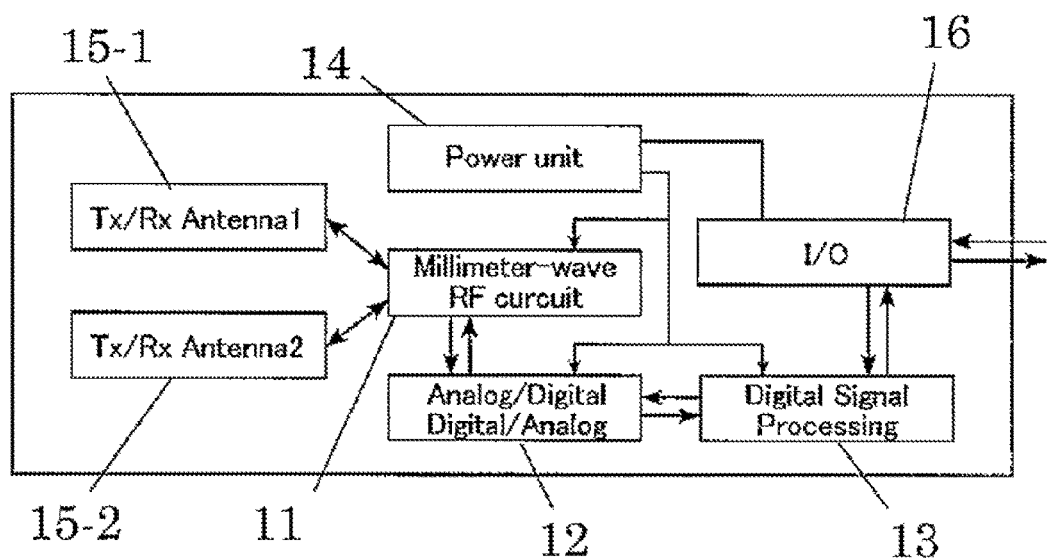

MILLIMETER-WAVE DIELECTRIC LENS ANTENNA AND SPEED SENSOR USING SAME

TECHNICAL FIELD

The present invention relates to a speed sensor that performs reflection response measurement through the Doppler effect by using an electromagnetic wave of a millimeter wave band.

BACKGROUND ART

A speed sensor is used as a speed measurement device of a moving object such as an automobile and a train in order to understand a motion circumstance of a target object. In a general moving object which moves by wheels or the like, a relative velocity is measured by measuring an angle of a rotation axis.

Frictional resistance by a surface state of a medium is applied at a contact portion of a road surface with a wheel and the like and thus a relative speed to the road surface without spinning may be measured.

However, an axial torque of a rotating object is greater than the frictional resistance in a low-p road which has a low frictional coefficient (mu ($\mu$)) and the rotating object such as a wheel is in a state of easily sliding. Thus, it is impossible to accurately measure the relative speed to the road surface. The weather condition such as rain and snow causes a medium which causes the frictional coefficient to be decreased to be interposed between contact portions of the road surface and the rotating object, in addition to the low-$\mu$ road. Thus, a situation similar to that in the low-$\mu$ road occurs.

When a centrifugal force at a time when an automobile curve-travels causes the vehicle body to be inclined, and thus a wheel rolling direction and a vehicle traveling direction are different from each other, there are many traveling conditions which cause inaccuracy in speed measurement using the rotational axis to occur. In a linear motor car which travels in a state where the car body is raised, it is impossible to perform measurement by using a contact type speed sensor.

A non-contact type speed sensor is a sensor which measures a relative speed to a direct contact road surface by using the Doppler effect or a spatial filter type detection principle. A measuring device using light or laser is expensive due to a configuration of using an optical system and accuracy for mounting the measuring device is required.

A road surface state of large undulation due to dirt, gravel, a snow surface, and the like or correspondence of an optical device to resistance against stress due to vibration of a vehicle body is a difficult problem in a speed sensor having an optical system.

As a non-contact type speed sensor which does not use an optical system, a Doppler module using a radio wave has been developed. The microwave which is emitted from a patch antenna having an antenna half power width of 30 degrees and more has an incident angle range to the road surface, which is equal to or greater than 30 degrees and a few, and a traveling direction speed of a cos $\theta$ component of the microwave having an incident angle $\theta$ is distributed in accordance with the incident angle range. Since signal strength of a reflected wave is attenuated by speed distribution, sensitivity is degraded and measurement can be performed at only a close range.

As an improvement plan for the above problems, a dielectric lens is provided on a patch antenna, a range of directivity of a radiated radio wave is reduced, light is condensed at one spot or more, and thereby suppression of sensitivity degradation due to an incident angle distribution has been considered. PTL 1 and PTL 2 disclose the background in this technical field.

A technology in which a beam of a narrow angle is emitted to a patch antenna which is a primary radiator, or an open portion of a waveguide by using a dielectric lens having a large opening area and thus improvement of an antenna gain is obtained is disclosed (see Abstract of PTL 1).

In dielectric antennas disclosed in PTL 1 and PTL 2, an optical axis of the dielectric lens matches with a vertical axis of an opening surface of the primary radiator, and thus maximization of gain is obtained most conveniently.

However, it is necessary that a speed component cos $\theta$ in a traveling direction is obtained, in order to use the dielectric antennas in a speed sensor which is provided in a vehicle. Thus, a normal direction of the opening surface of the primary radiator is required to be installed so as to be inclined in accordance with an incident angle to the road surface. Accordingly, a frame having a slant surface of inclination $\theta$ is required in order to use a speed sensor which uses the dielectric antennas disclosed in PTL 1 and PTL 2. Since a frontal projected area in the traveling direction increases so as to be equal to or greater than sin $\theta$ of an opening diameter of the lens, a problem of road clearance with the road surface may occur, or an air resistance coefficient of a Cd value may increase and mounting adjustment of a speed sensor which is attached to the frame may be expected to be complicated.

CITATION LIST

Patent Literature

PTL 1: JP-A-2006-184144
PTL 2: JP-A-2000-278030

SUMMARY OF INVENTION

Technical Problem

When a non-contact sensor is installed on a horizontally vertical surface of an automobile or a railway car, the maximum gain direction of antenna radiation characteristics is directed to a direction of an angle $\theta$ without using a frame for inclining a sensor module, in order to obtain a component cos $\theta$ in a traveling direction.

Solution to Problem

To solve the above problems, for example, when beams are condensed by using one patch antenna and a cannonball-shaped dielectric lens, a cannonball-shaped dielectric lens obtained by inclining the cannonball-shaped dielectric lens in an aim condensing direction, causing the cannonball-shaped dielectric lens to pass through an optical axis center of a lens bottom surface, and cutting the cannonball-shaped dielectric lens by a plane parallel with a surface of an antenna-mounted board is used.

Advantageous Effects of Invention

The cannonball-shaped dielectric lens has an effect of refracting a radiated radio wave from a point source so as to become a parallel radio wave. Generally, in an opening portion of a waveguide or a patch antenna array which is aligned in accordance with phase characteristics, a normal direction of an opening surface becomes the maximum gain direction.

When a cannonball-shaped dielectric lens (below, also described as an inclination type cannonball-shaped dielectric lens) obtained by cutting a bottom surface so as to be inclined is loaded on such an opening portion of the waveguide, the dielectric lens antenna has radiation characteristics that gain becomes substantially maximized in an inclination direction of the cannonball-shaped lens and in the normal direction of the opening portion. Accordingly, maximizing of gain of the lens antenna is expected by causing inclination of the dielectric lens to match with a normal line of the opening surface. When a radio emission source is a point source, since the lens has radiation characteristics of a spherical surface wave shape, gain becomes constant regardless of a direction.

If the inclination type cannonball-shaped dielectric lens is loaded on such an emission source, the radiation characteristics of the lens antenna have the maximum point in only a direction of lens inclination. One patch antenna is configured by one patch and a GND electrode. The gain center of the radiation characteristics is in a normal direction of an antenna board, but the radiation characteristics has a substantially hemisphere surface wave shape.

Accordingly, it is possible to cause the maximum gain direction of the lens antenna to be inclined in an inclination direction of the dielectric lens which is different from the normal direction of the antenna board, by combining one patch antenna and the inclination type cannonball-shaped dielectric lens.

This feature may be obtained by only the inclination type cannonball-shaped dielectric lens determining a radiation direction of the dielectric lens antenna, and the patch antenna may be the common specifications even though speed sensors of various radiation directions are produced, and improvement of productivity of a sensor circuit board is expected.

BRIEF DESCRIPTION OF DRAWINGS

FIG. 1 is a perspective view of a dielectric lens antenna of a first example according to a first embodiment of the present invention.

FIG. 2 illustrates far field radiation characteristics of one patch antenna.

FIG. 3 illustrates condensing of beams of a radio wave by a cannonball-shaped dielectric lens.

FIG. 4 illustrates condensing of beams of a radio wave by an inclination type cannonball-shaped dielectric lens.

FIG. 5 is a side view of a dielectric lens antenna of a first example according to a second embodiment of the present invention.

FIG. 6 is a side view of a dielectric lens antenna of a second example according to the second embodiment of the present invention.

FIG. 7 is a side view of a dielectric lens antenna of a third example according to the second embodiment of the present invention.

FIG. 8 is a diagram illustrating side lobe radiation by the inclination type cannonball-shaped dielectric lens.

FIG. 9 is a diagram illustrating side lobe radiation by an inclination type cannonball-shaped dielectric lens in which a plurality of tapers having a truncated cone shape is provided.

FIG. 10 is a side view of a dielectric lens antenna of a fourth example according to the second embodiment of the present invention.

FIG. 11 is a perspective view of a speed sensor of a first example according to a third embodiment of the present invention.

FIG. 12 is a circuit configuration diagram of a speed sensor using the dielectric lens antenna.

FIG. 13 is a perspective view of a speed sensor of a second example according to the third embodiment of the present invention.

FIG. 14 is a schematic diagram illustrating a Doppler type speed detection of the speed sensor.

FIG. 15 is a perspective view of a speed sensor of a third example according to the third embodiment of the present invention.

FIG. 16 is a perspective view of a speed sensor of a fourth example according to the third embodiment of the present invention.

FIG. 17 is a circuit configuration diagram of a speed sensor using a plurality of dielectric lens antennas.

DESCRIPTION OF EMBODIMENTS

Embodiment 1

FIG. 1 is a perspective view of a dielectric lens antenna according to a first embodiment of the present invention. 1 indicates an inclination type cannonball-shaped dielectric lens. 2 indicates one patch antenna. 3 indicates a microstrip line. 4 indicates a mounted board. 5 indicates a GND electrode. The mounted board 4 uses an inorganic board which is formed of ceramics and the like, a single layer board of an organic board which is formed of glass epoxy resin and the like, and a multi-layer board obtained by alternately stacking the boards with a metallic thin film.

The one patch antenna 2 and the microstrip line 3 are formed on a surface of the mounted board 4. The GND electrode 4 is formed on a lower surface of the mounted board 4 as a facing electrode of the patch antenna and the microstrip line 3. The GND electrode has conductivity and functions to reflect a radio wave which is radiated from the patch antenna to the dielectric lens side.

A millimeter-wave signal which is fed to the microstrip line 3 is propagated to the one patch antenna 2 and radiated. A millimeter radio wave which is radiated from the patch antenna passes through the inclination type cannonball-shaped dielectric lens 1 and is emitted to a space. The inclination type cannonball-shaped dielectric lens 1 is formed from a substantially columnar shape 1-1 and a lens shape 1-2. The substantially columnar shape 1-1 is obtained by inclining and cutting a columnar end on a side which comes into contact with the antenna. The lens shape 1-2 has a convex surface.

The convex surface of the lens shape 1-2 has a shape obtained by using a central axis 32 of the lens as a cardinal point and rotating a circular arc based on an elliptic function. The radiation gain center of the one patch antenna 2 is in a normal direction 31 of the mounted board.

Radiated beams from the patch antenna 1 are refracted so as to condense beams in the central axis direction 32 of the convex surface of the lens by using an angle of a diagonal section of the substantially columnar shape 1-1 in the inclination type cannonball-shaped dielectric lens 1.

FIG. 2 illustrates an example of far field radiation characteristics of the one patch antenna. The patch antenna is for a linearly polarized wave and has antenna gains in an angle direction of an E surface and in an angle direction of an H surface. The patch antenna has a size of equal to or less than λ/2 of a signal and is a wide-angle antenna having a half power width of approximately ±60 degrees.

An angle of the gain center is 0 degree which is the normal direction of the mounted board 4. However, it is understood that the radiation gain is substantially flat in a range of ±60 degrees and the radiation characteristics have a hemisphere surface wave shape.

FIG. 3 is a diagram illustrating a configuration of radio wave condensing by the cannonball-shaped dielectric lens. When a position of an apex point of a cannonball-shaped portion in the dielectric lens 1-3 is set as T, surface coordinates of a lens cannonball-shaped portion are set as (X1,Z1), and a dielectric constant of a material of the lens is set as n, the surface coordinates (X1,Z1) of the lens are represented by the following expression on the assumption that a phase is aligned at a specific height (condition of a constant optical path length: Snell's law).

$$n\sqrt{X_1^2 + Z_1^2} + (T - Z_1) = nT \quad \text{[Math. 1]}$$

$$(n^2 - 1)\left(Z_1 - \frac{T}{n+1}\right)^2 + n^2 X_1^2 = \frac{(n+1)\cdot(n-1)^2 + n - 1}{n+1} T^2 \quad \text{[Math. 2]}$$

(Math. 2) is an expression of an elliptic function, that is, is (Math. 3), $$\frac{(Z - Z_0)^2}{a^2} + \frac{(X - X_0)^2}{b^2} = 1^2 \quad \text{[Math. 3]}$$

the diameter a in a Z direction is (Math. 4), $$a = \frac{n}{n+1} T \quad \text{[Math. 4]}$$

the diameter b in an X direction is (Math. 5), $$b = \sqrt{\frac{n-1}{n+1}} T \quad \text{[Math. 5]}$$

and thereby a lens curved surface of a semioval shape is formed.

A radiated radio wave is converted into a plane wave from a hemisphere surface wave by the dielectric lens. However, an angle (half power width) of the antenna beam is determined by an effective opening area of the lens antenna.

a and b which are elliptic diameters of the cannonball-shaped portion of the dielectric lens antenna are the best solutions of a beam analysis result based on Snell's law for obtaining a parallel radio wave. However, since a diffraction effect causes directivity of the antenna to be changed, it is important that the diameters a and b which are elliptic diameters are not numerical limitations of (Math. 6) and (Math. 7), and $$a = \frac{n}{n+1} T \quad \text{[Math. 6]}$$

$$b = \sqrt{\frac{n-1}{n+1}} T \quad \text{[Math. 7]}$$

the portion has an elliptic shape similar to the best solution.

FIG. 4 is a diagram illustrating a configuration of radio wave condensing by an inclination type cannonball-shaped dielectric lens. A reference sign of 1-4 in FIG. 4 indicates the inclination type cannonball-shaped dielectric lens. The bottom surface of the cannonball-shaped dielectric lens is formed to be inclined such that the antenna beam in the dielectric lens is inclined to an aim orientation (angle θ1) from the normal direction 31 of the mounted board 4. Since the millimeter radio wave which is radiated from the patch antenna 2 has radiation characteristics of a hemisphere surface shape, if the inclination type cannonball-shaped dielectric lens 1-4 is used, condensing may be enabled even though the bottom surface of the dielectric lens is inclined from the mounted board in a range of ±60 degrees.

Accordingly, it is possible to radiate the center of the radiation gain of the dielectric lens antenna from the normal direction 31 of the mounted board 4 in an inclination direction which is a direction of an angle θ1 by using the inclination type cannonball-shaped dielectric lens 1-4.

Embodiment 2

FIG. 5 is a side view of a dielectric lens antenna of a first example according to a second embodiment of the present invention. 1 indicates an inclination type cannonball-shaped dielectric lens. 2 indicates one patch antenna. 4 indicates a mounted board. 6 indicates a second dielectric lens.

The second dielectric lens is a unilateral convex surface lens or a dual-sided convex surface lens. The second dielectric lens uses a dielectric lens having a large opening area in order to much more condense a millimeter radio wave which is radiated from the inclination type cannonball-shaped dielectric lens 1.

FIG. 6 is a side view of a dielectric lens antenna of a second example according to a second embodiment of the present invention. Generally, a radio wave which passes through an optical axis of a lens travels straight without refraction. A radiation direction of beams may be much more inclined using refraction by causing the millimeter radio wave which is radiated from the inclination type cannonball-shaped dielectric lens 1 to avoid the optical axis and to be directed to a peripheral portion.

FIG. 7 is a side view of a dielectric lens antenna of a third example according to a second embodiment of the present invention.

7 indicates a second dielectric lens, but the second dielectric lens is also used as a cover for protecting the inclination type cannonball-shaped dielectric lens 1 or the mounted board. 8 indicates a housing case which surrounds the dielectric lens antenna. The dielectric lens cover 7 and the housing case 8 cause the inclination type cannonball-shaped dielectric lens 1 or the patch antenna 2 to be sealed. Thus, the dielectric lens antenna is not exposed in the outer air even though the dielectric lens antenna is installed on the surroundings of an automobile or a railway car, and thus it is possible to secure durability and reliability.

FIG. 8 is a diagram illustrating side lobe radiation of the lens antenna when the inclination type cannonball-shaped dielectric lens is loaded. The one patch antenna has hemisphere-shaped radiation characteristics. A radio wave is formed at apart of a cannonball-shaped lens in the Z direction by using Snell's law and refraction. However, a radio wave which is radiated in the X direction is formed on a cylindrical side surface. One inclined side surface is reduced by inclining the cannonball-shaped dielectric lens. However, another side surface increases and side lobe of the lens antenna also increases.

FIG. 9 is a diagram illustrating radiation when a plurality of tapers having a truncated cone shape is provided on a cylindrical side surface of the inclination type cannonball-shaped dielectric lens. A critical angle θ of an incident angle of a radio wave which reaches a side surface of the cannonball-shaped dielectric lens, $$\theta = \sin^{-1}(1/n) \qquad \text{[Math. 8]}$$

(where, n: dielectric constant of lens)

is designed to be equal to or more than a value indicated in (Math. 8) and to be in a range of less than 90 degrees. Thus, a radio wave which reaches the side surface may be totally reflected in the Z direction and be guided to the cannonball-shaped lens portion.

The side lobe of the radiation characteristics of the antenna by the inclination type cannonball-shaped dielectric lens is reduced by performing total reflection on the side surface of the lens, and an effect of improving the antenna Gain in a main lobe direction is expected.

Covering the side surface with a metallic conductor is considered as other methods for performing total reflection on the side surface of the inclination type cannonball-shaped dielectric lens. However, since radio wave diffraction occurs at a metallic end, it is impossible to expect an effect of reducing side lobe. Performing partial plating on the side surface of the lens is similar.

FIG. 10 is a side view of a dielectric lens antenna of a fourth example according to the second embodiment of the present invention. 9 indicates an inclination type cannonball-shaped dielectric lens to which the truncated cone taper is attached. The side lobe is reduced by using the dielectric lens 9 and thereby an effect of suppressing a radio wave which propagates the inside of a case is expected and it is possible to have a reduced influence on the electric circuit which is disposed in the case.

Embodiment 3

FIG. 11 is a perspective view of a speed sensor of a first example according to a third embodiment of the present invention.

1 indicates an inclination type cannonball-shaped dielectric lens, 2 indicates one patch antenna, 4 indicates a mounted board, 11 indicates a millimeter-wave band RF circuit, and 12 indicates an Analog/Digital Converter (ADC) or a Digital/Analog Converter (DAC). 13 indicates a Digital Signal Processing Unit (DSP) and 14 indicates a Power Unit.

FIG. 12 is a circuit configuration diagram of the speed sensor illustrated in FIG. 11. A millimeter-wave signal which is generated by the RF circuit portion 11 is radiated from a Tx/Rx antenna 15 which is formed from the dielectric lens 1 and the one patch antenna. The radiated signal reaches and is reflected by a measurement object which is a target. The reflected signal is received by the Tx/Rx antenna 15 again.

The received millimeter-wave signal includes a Doppler signal by a difference in a relative speed and the Doppler signal is extracted by the millimeter-wave RF circuit 11 comparing a transmission wave and received millimeter-wave.

The extracted Doppler signal is converted into a digital signal by the ADC 12 and a Doppler frequency is detected by the DSP 13 performing the Fourier transform.

FIG. 13 is a schematic diagram of a Doppler type speed detection method using the speed sensor. 21 indicates the speed sensor, and 22 indicates a vehicle body of an automobile. 23 indicates a wheel and 24 indicates a road surface. The speed sensor 21 is a speed sensor which enables radiation in an inclination direction by using the inclination type cannonball-shaped dielectric lens and the one patch antenna illustrated in FIG. 11.

If the speed sensor 21 is provided on a horizontally vertical surface of the vehicle body 22 of the automobile, beams are emitted at an incident angel θ to the road surface 24. When the vehicle body 22 moves at a speed v, and a frequency of a millimeter-wave signal which is emitted from the speed sensor 21 is set as fo, a signal which is reflected by the road surface 24 satisfies (Math. 9).

$$f_r = \left(1 + \frac{2v\cos\theta}{c}\right)f_0 \qquad \text{[Math. 9]}$$

A Doppler frequency which is detected by the millimeter-wave RF circuit 11 and the DSP 13 satisfies (Math. 10).

$$f_d = \frac{2v\cos\theta}{c}f_0 \qquad \text{[Math. 10]}$$

A relative speed satisfies (Math. 11).

$$v = \frac{c}{2f_o\cos\theta}f_d \qquad \text{[Math. 11]}$$

In this manner, calculation is performed.

FIG. 14 is a perspective view of a speed sensor of a second example according to the third embodiment of the present invention. 1 indicates an inclination type cannonball-shaped dielectric lens, and 2 indicates one patch antenna. 4 indicates a mounted board, and 11 indicates a millimeter-wave band RF circuit. 12 indicates an Analog/Digital Converter (ADC) or a Digital/Analog Converter (DAC). 13 indicates a Digital Signal Processing Unit (DSP) and 14 indicates a Power Unit.

The one patch antenna 2 is formed from two patch antennas and the two patch antennas are antennas of a linearly polarized wave. The two patch antennas are disposed at a desired intersection angle such that interference does not occur between the two patch antennas. The linearly polarized wave antennas are considered that a degree of interference is most suppressed when polarized surfaces of the antennas are orthogonal to each other. The inclination type cannonball-shaped dielectric lens 1 is also installed on each of the one patch antennas and inclination of the dielectric lens is provided such that signals are radiated in directions of elevation angles θ1 and θ2.

If combination of the one patch antenna and the inclination type cannonball-shaped dielectric lens may be provided on the mounted board, it is possible to realize a speed sensor which has a third elevation angle θ3 in addition to the elevation angles θ1 and θ2.

FIG. 15 is a perspective view of the speed sensor which is surrounded by the housing case.

A reference sign of 7 indicates the dielectric lens cover and 8 indicates the housing case. A beam emission elevation angle direction is set by the inclination type cannonball-shaped dielectric lens 1 and the dielectric lens cover, and a beam horizontal angle is set to be an intersection angle obtained by performing disposition on the mounted board 4. Accordingly, the speed sensor 21 illustrated in FIG. 15 may be directly mounted on a vertically horizontal surface of the vehicle body 22 without a frame for inclination.

A lens portion of the dielectric lens cover 7 may be disposed on an extension line of the optical axis of the inclination type cannonball-shaped dielectric lens 1, and thus lens portions corresponding to each of lens covers may be disposed at a distance from each other. If the lens portions for the lens covers are disposed such that the distance between the lens portions is reduced, since one patch antennas may be disposed such that a distance between the one patch antennas is reduced, it is possible to reduce occupation area of the antenna on the mounted board and it is possible to use a mounted board having a more reduced size.

In the dielectric lens antenna in the related art, a configuration in which the normal direction of the patch antenna and the optical axis of the dielectric lens match with each other is made. Thus, it is possible to obtain only a parallel beam even though two speed sensors are provided on the same mounted board. FIG. 16 is a perspective view of a speed sensor which is configured by the dielectric lens cover 7 which has a function as one lens. Optical axes of two inclination type cannonball-shaped dielectric lenses 1 are positioned at the peripheral portion of the lens cover 7 and thus beams may be condensed in different vector directions by refraction.

FIG. 17 is a circuit configuration diagram of the speed sensor illustrated in FIGS. 14 and 15. A set of two Tx/Rx antennas 15 is configured and each of the two Tx/Rx antennas 15 is formed from the dielectric lens 1 and the one patch antenna. A reflection signal which is obtained from the antenna is extracted by the millimeter-wave RF circuit 11 and the DSP 13. Since speed components having different vector angles may be calculated from the set of two Tx/Rx antennas 15, performing of vector computation may cause two types of speeds in a direction orthogonal to the traveling direction to be observed.

REFERENCE SIGNS LIST

1 INCLINATION TYPE CANNONBALL-SHAPED DIELECTRIC LENS
2 ONE PATCH ANTENNA
3 MICROSTRIP LINE
4 MOUNTED BOARD
5 GND ELECTRODE
6 SECOND DIELECTRIC LENS
7 SECOND DIELECTRIC LENS AND PROTECTION COVER, DIELECTRIC LENS COVER
8 HOUSING CASE
9 INCLINATION TYPE CANNONBALL-SHAPED DIELECTRIC LENS TO WHICH A TRUNCATED CONE-SHAPED TAPER IS ATTACHED
11 MILLI-WAVE BAND RF CIRCUIT
12 ADC, DAC
13 DSP
14 POWER, POWER UNIT
15 TX/RX ANTENNA
16 INPUT/OUTPUT, I/O
21 SPEED SENSOR
22 VEHICLE BODY OF AUTOMOBILE
23 WHEEL
24 ROAD SURFACE
31 NORMAL LINE OF BOARD
32 DIELECTRIC LENS

The invention claimed is:

1. A dielectric lens antenna which includes an antenna on a dielectric board, a signal line having a first end that receives a signal and a second end which is connected to one end of the antenna, and a lens disposed just on the antenna, wherein
the lens has a first portion which is fixed to the board, and a second portion which is configured from a convex surface or has the convex surface, the first portion guiding the signal to the second portion,
the first portion has a substantially columnar shape and a bottom surface portion of the first portion has a shape in which the substantially columnar portion is cut to be inclined,
the bottom surface of the first portion is provided just on the antenna, and one end portion of the substantially columnar shape of the first portion and a portion of the second portion on an opposite side of the convex surface are integrally formed,
the convex surface of the second portion has a spheroidal shape, and
a central direction of radiation gain of the antenna or a normal direction of a board surface is different from a central axis direction of the convex surface of the lens.

2. The dielectric lens antenna according to claim 1, wherein
the antenna is one patch antenna which is provided on the dielectric board in which a GND electrode is provided on a back surface.

3. The dielectric lens antenna according to claim 2, wherein
the antenna is one patch antenna which is provided on the dielectric board, and a radiation direction of the antenna matches with the normal direction of the dielectric board surface.

4. The dielectric lens antenna according to claim 1, wherein
the lens is a dielectric lens which is processed by using any of resin, an organic material, glass, and an inorganic material,
the lens includes a spherical shape in order to condense beams, and
the lens is an inclination type spherical-shaped dielectric lens in which a spherical-shaped portion has a shape of having a curved surface obtained by rotating an elliptic curve about the optical axis, and a bottom side of a cylindrical portion is obtained by performing cutting parallel with the dielectric board surface in a state where an optical axis of the dielectric lens is inclined by a central direction of a radiation gain of a patch antenna.

5. The dielectric lens antenna according to claim 1, wherein
the lens has a lens optical axis which is inclined in a range of the half power width of radiation characteristics of the antenna.

6. The dielectric lens antenna according to claim 1, wherein
when a distance from an apex on an optical axis of an elliptic shape of a spherical-shaped portion to a position of a radio wave point source at the center of a patch antenna is set as a distance T, the lens is an inclination type spherical-shaped dielectric lens in which an optical axis of the dielectric lens is inclined by a central direction of a radiation gain of a patch antenna and a lens diameter b of the spherical-shaped portion is set in accordance with the following equation.

$$b = \sqrt{\frac{n-1}{n+1}} T$$

(here, n: dielectric constant of lens).

7. The dielectric lens antenna according to claim 1, wherein
the lens is configured from a first inclination type spherical-shaped dielectric lens and a second dielectric lens, one curved surface is at least a convex surface in the second dielectric lens, and the second dielectric lens has an effect of further condensing antenna beams which are obtained from the first spherical-shaped dielectric lens, or an effect of reducing an angle of emission relative to the dielectric board.

8. The dielectric lens antenna according to claim 7, wherein
the second dielectric lens comes into contact with a housing case and functions as a cover for protecting the patch antenna or the first dielectric lens.

9. The dielectric lens antenna according to claim 4, wherein
in the inclination type spherical-shaped dielectric lens, a value of a critical angle is applied through [Math. 13] among radio incident angles from a position of the point source of the one patch antenna to a spherical-shaped cylindrical side surface, and a plurality of tapers having a truncated cone shape is provided by using the optical axis of the lens at the spherical-shaped portion as a rotational axis, range of ($\theta=\sin^{-1}(1/n)$, $n$: dielectric constant of lens) or more and less than 90 degrees. [Math. 13]

10. The dielectric lens antenna according to claim 1, wherein
the dielectric lens antenna functions as a speed sensor in which an electric circuit including a millimeter-wave band RF circuit, an ADC/DAC, a DSP, and a power source circuit is disposed on the dielectric board, a millimeter-wave signal which is generated in the millimeter-wave RF circuit is transmitted or received through the dielectric lens antenna, and a speed component is calculated from a Doppler frequency which is detected from a difference between a transmission signal and a reception signal in the electric circuit.

11. The dielectric lens antenna according to claim 10, wherein
the speed sensor has two antenna beams or more which have different radiation directions by setting an elevation angle of the antenna in the radiation direction as the maximum gain direction by the lens by disposing a plurality of inclination type spherical-shaped dielectric lenses in which an optical axis of the dielectric lens is inclined by a central direction of a radiation gain of a patch antenna and using one second dielectric lens or more, and designing a horizontally relative angle of the antenna in the radiation direction as a mutual intersection angle of a linearly polarized wave surface of the patch antenna on the dielectric board.

12. The dielectric lens antenna according to claim 1, wherein
the central axis direction of the convex surface of the lens is provided so as to be inclined to the normal direction of the board surface.

* * * * *